US010688824B2

(12) United States Patent
Patrick et al.

(10) Patent No.: US 10,688,824 B2
(45) Date of Patent: *Jun. 23, 2020

(54) COMPOUND SINUSOIDAL WHEEL APPLICABLE TO MATERIALS HANDLING EQUIPMENT

(71) Applicant: Shark Wheel, LLC, Lake Forest, CA (US)

(72) Inventors: David Michael Patrick, Lake Forest, CA (US); Robert S. Patrick, Plano, TX (US)

(73) Assignee: Shark Wheel, Inc., Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/181,920

(22) Filed: Nov. 6, 2018

(65) Prior Publication Data

US 2019/0077188 A1  Mar. 14, 2019

Related U.S. Application Data

(63) Continuation of application No. 14/953,218, filed on Nov. 27, 2015, now Pat. No. 10,118,439.

(51) Int. Cl.
*B60B 15/02* (2006.01)
*B60B 21/00* (2006.01)
(Continued)

(52) U.S. Cl.
CPC ............ *B60B 15/025* (2013.01); *B60B 15/00* (2013.01); *B60B 15/02* (2013.01); *B60B 15/023* (2013.01);
(Continued)

(58) Field of Classification Search
CPC ....... B60B 11/02; B60B 15/025; B60B 15/02; B60B 15/00; B60B 15/023; B60B 21/00; B60B 21/02; B60B 21/10; B60C 11/03
See application file for complete search history.

(56) References Cited

U.S. PATENT DOCUMENTS 694,303 A   2/1902  Beskow
740,035 A   9/1903  Nichols
(Continued)

FOREIGN PATENT DOCUMENTS

EP   1810560 A1 *  7/2007  ........... A01B 29/043
FR   2201980 A1 *  5/1974  ............... B60C 7/00
(Continued)

OTHER PUBLICATIONS

Shark Wheel, Shark Wheel on "Nature Knows Best," Published Nov 7, 2017, YouTube, https://www.youtube.com/watch?v=OQYsxl0jXGA.
(Continued)

*Primary Examiner* — Scott A Browne
(74) *Attorney, Agent, or Firm* — Cionca IP Law P.C.; Marin Cionca

(57) ABSTRACT

A materials handling equipment has blades of a lifting fork wherein each of the blades engages a blade wheel that moves between a retracted position when the blade is lowered and an extended position when the blade is raised to lift and support a load. The blade wheels have a plurality of tires linearly aligned on a common axis, the tires each having a circular circumference and a sinusoidally varying peripheral surface. The sinusoidally varying peripheral surfaces have relative peaks and valleys uniformly spaced around the circular circumference wherein the peaks and valleys are mutually nested.

15 Claims, 6 Drawing Sheets

(51) Int. Cl.
  *B60B 21/02* (2006.01)
  *B60B 15/00* (2006.01)
  *B60B 21/10* (2006.01)
  *B60B 25/00* (2006.01)
  *B60B 11/06* (2006.01)
  *B60B 11/02* (2006.01)

(52) U.S. Cl.
  CPC .............. *B60B 21/00* (2013.01); *B60B 21/02* (2013.01); *B60B 21/10* (2013.01); *B60B 11/02* (2013.01); *B60B 11/06* (2013.01); *B60B 25/006* (2013.01); *B60B 2360/10* (2013.01); *B60B 2360/30* (2013.01); *B60B 2900/1212* (2013.01); *B60B 2900/1216* (2013.01); *B60B 2900/311* (2013.01); *B60Y 2200/10* (2013.01)

(56) References Cited

U.S. PATENT DOCUMENTS

| | | | |
|---|---|---|---|
| 851,055 | A | 4/1907 | Beskow |
| 907,991 | A * | 12/1908 | Goodfellow ............ B60B 15/26 |
| | | | 301/41.1 |
| 1,081,844 | A | 12/1913 | Laurencich |
| D54,599 | S * | 3/1920 | Clarke .......................... D12/587 |
| 1,395,734 | A | 11/1921 | Root |
| 1,453,542 | A | 5/1923 | Beisel |
| 1,876,628 | A * | 9/1932 | Dawe ........................ B60S 1/68 |
| | | | 301/52 |
| 2,372,585 | A * | 3/1945 | Klumb .................. B62B 3/0625 |
| | | | 280/43.12 |
| 2,618,490 | A * | 11/1952 | Frischmann ........ B60B 33/0028 |
| | | | 280/43.12 |
| 2,683,495 | A | 7/1954 | Kopczynski |
| 2,786,540 | A | 3/1957 | Sfredda |
| 2,790,503 | A | 4/1957 | Kopczynski |
| 2,819,767 | A | 1/1958 | Kopczynski |
| 2,964,887 | A | 12/1960 | Orozco |
| 3,181,640 | A * | 5/1965 | Goodacre ................. B62D 7/02 |
| | | | 180/19.2 |
| 3,243,194 | A * | 3/1966 | Trusock .............. B60B 33/0052 |
| | | | 280/43.12 |
| 3,363,713 | A | 1/1968 | Blonsky |
| 3,717,380 | A | 2/1973 | Eastwood, II |
| 3,852,910 | A | 12/1974 | Everett |
| 3,870,372 | A | 3/1975 | Knipp |
| 4,102,423 | A | 7/1978 | Reid |
| 4,133,371 | A | 1/1979 | Birch et al. |
| 4,272,998 | A | 6/1981 | F'Geppert |
| 4,301,616 | A | 11/1981 | Gudgel |
| 4,674,757 | A | 6/1987 | Martin |
| 4,817,747 | A | 4/1989 | Kopczynski |
| 4,979,406 | A | 12/1990 | Waller |
| 5,259,802 | A | 11/1993 | Yang |
| 5,601,491 | A | 2/1997 | Chan et al. |
| 5,881,831 | A | 3/1999 | Harvey |
| 6,120,356 | A | 9/2000 | Jaskowiak et al. |
| 6,227,622 | B1 | 5/2001 | Roderick et al. |
| 6,244,937 | B1 | 6/2001 | Jaskowiak et al. |
| 6,358,133 | B1 | 3/2002 | Cesena et al. |
| 6,402,342 | B1 | 6/2002 | Chiang |
| 7,090,057 | B2 | 8/2006 | Fryska et al. |
| 7,128,175 | B1 | 10/2006 | Martineau |
| D541,047 | S | 4/2007 | Moon |
| 7,311,318 | B1 * | 12/2007 | Funk ...................... A63C 17/22 |
| | | | 280/87.042 |
| D576,795 | S | 9/2008 | Moon |
| 7,749,033 | B1 | 7/2010 | Paulus |
| 7,803,031 | B1 | 9/2010 | Winckler et al. |
| 8,002,294 | B2 | 8/2011 | Brandeau |
| 8,020,679 | B2 | 9/2011 | Wu |
| D703,442 | S | 4/2014 | Parker |
| D718,938 | S | 12/2014 | Parker |
| D732,293 | S | 7/2015 | Parker et al. |
| D775,283 | S | 12/2016 | Parsley |
| 10,118,439 | B1 * | 11/2018 | Patrick .................... B60B 15/02 |
| 2005/0116539 | A1 | 6/2005 | Jiazheng |
| 2007/0151645 | A1 * | 7/2007 | Mathews ............ B60C 11/0309 |
| | | | 152/209.18 |
| 2008/0125001 | A1 | 5/2008 | Barniak |
| 2009/0243371 | A1 | 10/2009 | Karlsson |
| 2011/0203708 | A1 | 8/2011 | Karlsson |
| 2011/0233991 | A1 | 9/2011 | Norman |
| 2013/0337104 | A1 | 12/2013 | Vannarsdall |
| 2014/0132059 | A1 * | 5/2014 | Patrick .................... B60B 3/002 |
| | | | 301/62 |
| 2014/0175350 | A1 * | 6/2014 | Mariotti ................. B62B 3/0631 |
| | | | 254/2 R |
| 2015/0298501 | A1 | 10/2015 | Engel |

FOREIGN PATENT DOCUMENTS

| | | |
|---|---|---|
| GB | 263965 | 1/1927 |
| JP | 58191603 | 11/1983 |
| RU | 2438879 | 1/2012 |
| WO | 2016048880 | 3/2016 |

OTHER PUBLICATIONS

Wikipedia, "Shark Wheel," Last edited Jan 2, 2018, https://en.wikipedia.org/wiki/Shark_Wheel.

Kickstarter Campaign, "Shark Wheel—the Square Skateboarding Wheel that Shat Shreds!," Published Jun. 2013, https://www.kickstarter.com/projects/1537100752/shark-wheel-the-square-skateboarding-wheel-that-sh/description.

* cited by examiner

COMPOUND SINUSOIDAL WHEEL APPLICABLE TO MATERIALS HANDLING EQUIPMENT

FIELD OF THE INVENTION

The invention relates to the commercial and industrial transportation and trucking industries and more particularly to apparatus and equipment for moving commercial and industrial goods for loading, storing and shipping. Still more specifically, the invention relates to wheels used by materials handling equipment for supporting forks during movement of loads.

BACKGROUND OF THE INVENTION

The forklift truck has been around for a century, and today it is found in every warehouse operation around the world. Commercial and industrial goods of all kinds are moved in bulk for economic efficiency. Forklift trucks and hand operated jacks, usually referred to as "manual jacks," typically use forks, that is, at least a pair of horizontally protruding blades or tines as load bearing elements. The forks are mechanized in order to lift loads clear of ground surfaces so that the loads may be moved from place to place. The forks may be engaged with a pallet that has goods stored on top. In this manner the goods may be lifted, moved, and then lowered or raised to a new location. This procedure is very well known in the field of the invention.

"Forklift" is the common generic term used to refer to the various types of materials handling equipment that uses a fork for moving loads. Fork type equipment may be informally classified as follows:

class 1—electric motor rider trucks;
class 2—electric motor narrow aisle trucks;
class 3—electric motor or hydraulic hand operated jacks;
class 4—internal combustion engine trucks—cushion tires;
class 5—internal combustion engine trucks—pneumatic tires;
class 6—electric and internal combustion engine tractors; and
class 7—rough terrain forklift trucks.

All of the foregoing classes of fork type equipment have in common that they are types of forklift jacks, or simply "forklifts" or "materials handling" equipment. Jacking mechanisms typically are motorized or hydraulically operated. A forklift may be a powered industrial truck; that is, a forklift truck, used to lift and move materials horizontally and vertically. A forklift may also be a manual jack; typically a hydraulic lifter which may be operated, propelled, and steered manually. Both the forklift truck and manual jack are designed for handling heavy loads which may or may not be palletized, and for moving such loads over relatively short distances. Of course, there are exceptions and hybrid types of forklifts. Collectively these will be termed "forklifts" or "materials handling equipment" herein throughout.

Typically, the fork element of such materials handling equipment has wheels which may be retracted into its blades so that the blades may be dropped to a floor surface. The wheels may be extended into contact with the floor surface as the blades are lifted. Therefore, the extended wheels are relied upon to help support loads placed on the fork as a load is moved and maneuvered. Because the blades must be able to fit into a pallet with clearance, they must be relatively thin and flat, dimensions that necessitate associated blade wheels have a relatively small diameter in order to fit inside the blades. This has several drawbacks, including the fact that small diameter wheels have difficulty in traversing rough or cracked floor surfaces and doorway thresholds, and having small circumferences such wheels tend to wear out quickly.

Blade wheels support much of the weight of a load during forklift operations. Blade wheels may be axially elongated so as to reduce instantaneous stress on floor surfaces. Typical blade wheels have a limited useful life as they wear, crack, spall, and develop flats so that they must be replaced frequently. Therefore, there is a need for materials handling equipment load and drive wheels that will minimize damage to floor surfaces, have a longer operating life than wheels in current use, and are able to more easily traverse uneven floor surfaces and thresholds. The presently described and illustrated compound sinusoidal wheel has been shown through extensive testing to have significant advantages over forklift and materials handling equipment load and drive wheels in current use.

BRIEF DESCRIPTION OF THE DRAWING

Embodiments of the invention are illustrated as examples only. Alpha-numerical call-outs are used to identify elements of the invention, wherein the same alpha-numerical call-out refers to the same element as it may appear in several drawing figures; wherein.

DETAILED DESCRIPTION OF THE INVENTION

Figure 1:
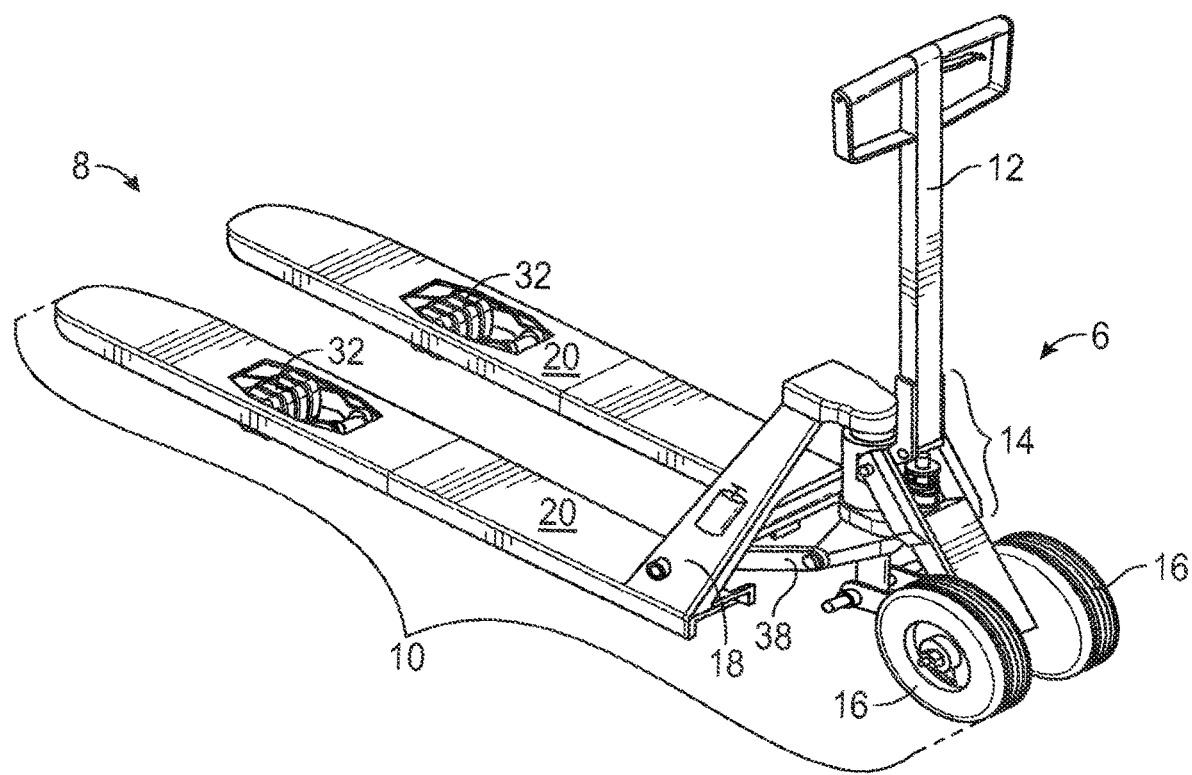
FIG. 1 is a perspective view of a forklift showing a fork thereof in a lowered attitude with compound sinusoidal wheels retracted.
Figure 2:
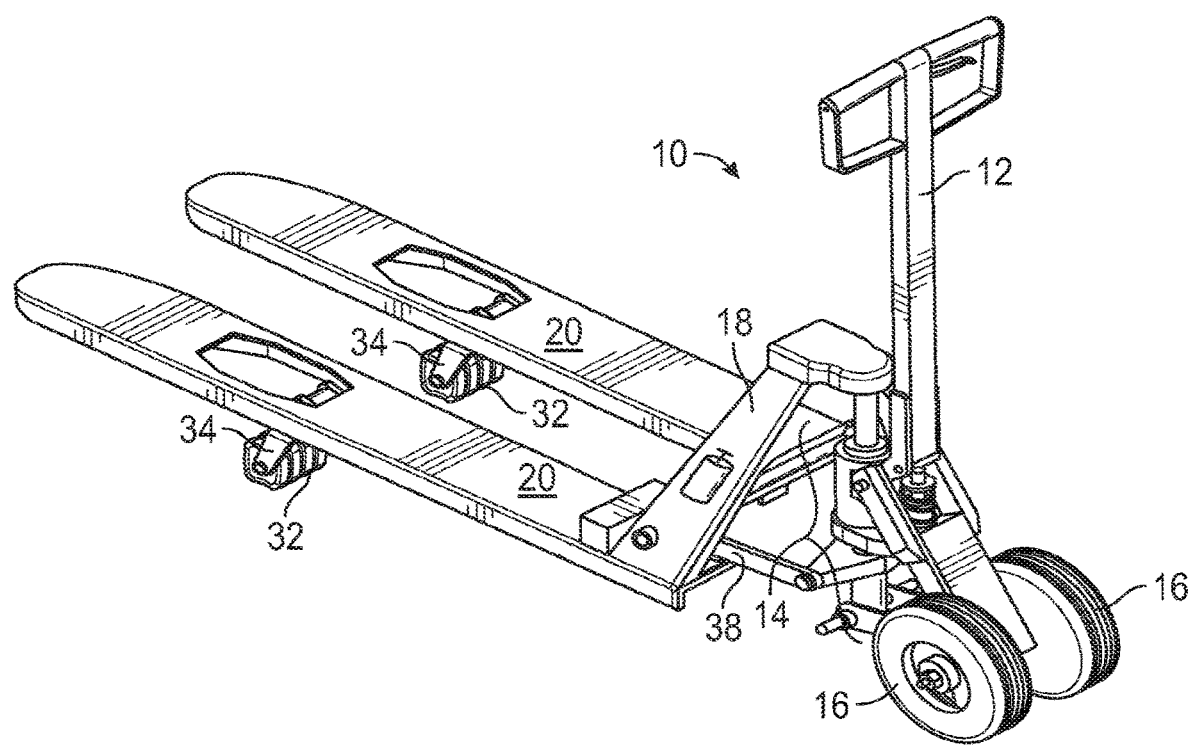
FIG. 2 is a further perspective view thereof showing the fork in a raised attitude.

In this description, manual jack 10 as shown in FIGS. 1 and 2 is used as only an example to illustrate the features and operations of forklift and materials handling equipment in general and it should be recognized that such features and operations are common to most forklift and materials handling equipment. It should be realized that forklift and materials handling equipment, including manual jack 10, may be used to move loads stored on a pallet or, alternatively, in the absence of a pallet. Manual jack 10 has a proximal end 6 and a distal end, 8. Manual jack 10, as illustrated, is well-known in the art. A forklift truck (not shown), is also very well known in the art and both manual jack 10 and a forklift truck may be referred to as "load movers" and "materials handling equipment" as they represent a class of conveyance machines that are related in their construction, operation, and duty. In this description, we refer to the illustrated apparatus as manual jack 10. However, the following description applies to both the manual jack type as well as the forklift truck type and other related conveyance and materials handling equipment.

Figure 3:
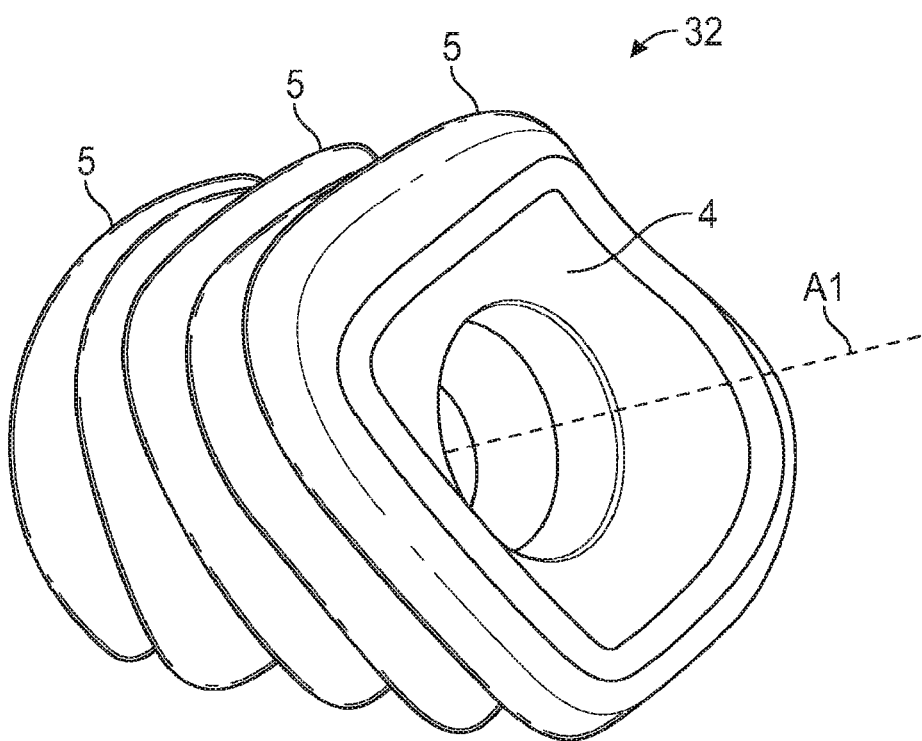
FIG. 3 is a perspective view of a typical compound sinusoidal wheel.
Figure 4:
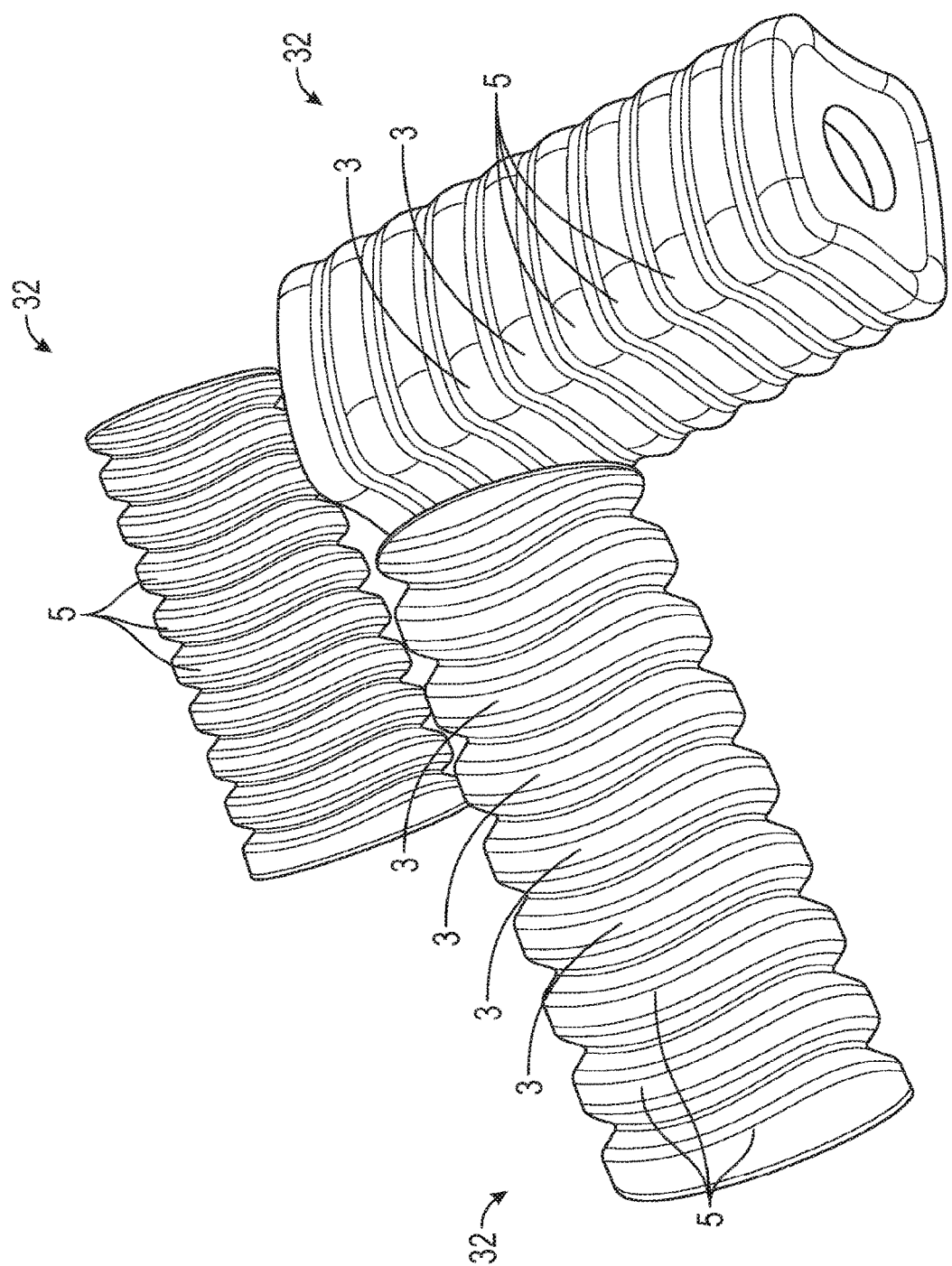
FIG. 4 is a perspective view of three compound sinusoidal wheels.

Manual jack 10 is manually moved and steered in its operation. FIG. 1 shows that manual jack 10 may have a lifting apparatus 14 such as a hydraulic cylinder and linkages positioned at proximal end 6, while lifting apparatus 14 may be mechanically engaged with fork 18 which may have two elongated and spaced-apart blades 20 extensive between proximal end 6 and distal end 8. Blade wheels 32 may be engaged with each blade 20, wherein each blade wheel 32 may have plural tires 5 mounted on a common axial core 4 and axially aligned on a rotational axis A1 as shown in FIG. 3. It is noted that each one of tires 5 has a sinusoidally shaped peripheral surface 33 as best seen in FIG. 4. Blade wheels 32 may be linked with lifting apparatus 14 (as shown in FIGS. 1 and 2) by linkage 38 such when fork 18 is lowered blade wheels 32 are retracted, as shown in FIG. 1, and when fork 18 is raised, blade wheels 32 are extended, as shown in FIG. 2, This is well known in the field. FIG. 3 illustrates that tires 5 of blade wheel 32 are integrally joined and mutually nested as may be achieved by co-molding tires 5 so that they are integral, that is, inseparable and of one common continuous material. Tires 5 may be molded of polyurethane or other hard materials.

FIG. 4 clearly shows the sinusoidal peripheral surfaces 3 of each tire 5.

Figure 5:
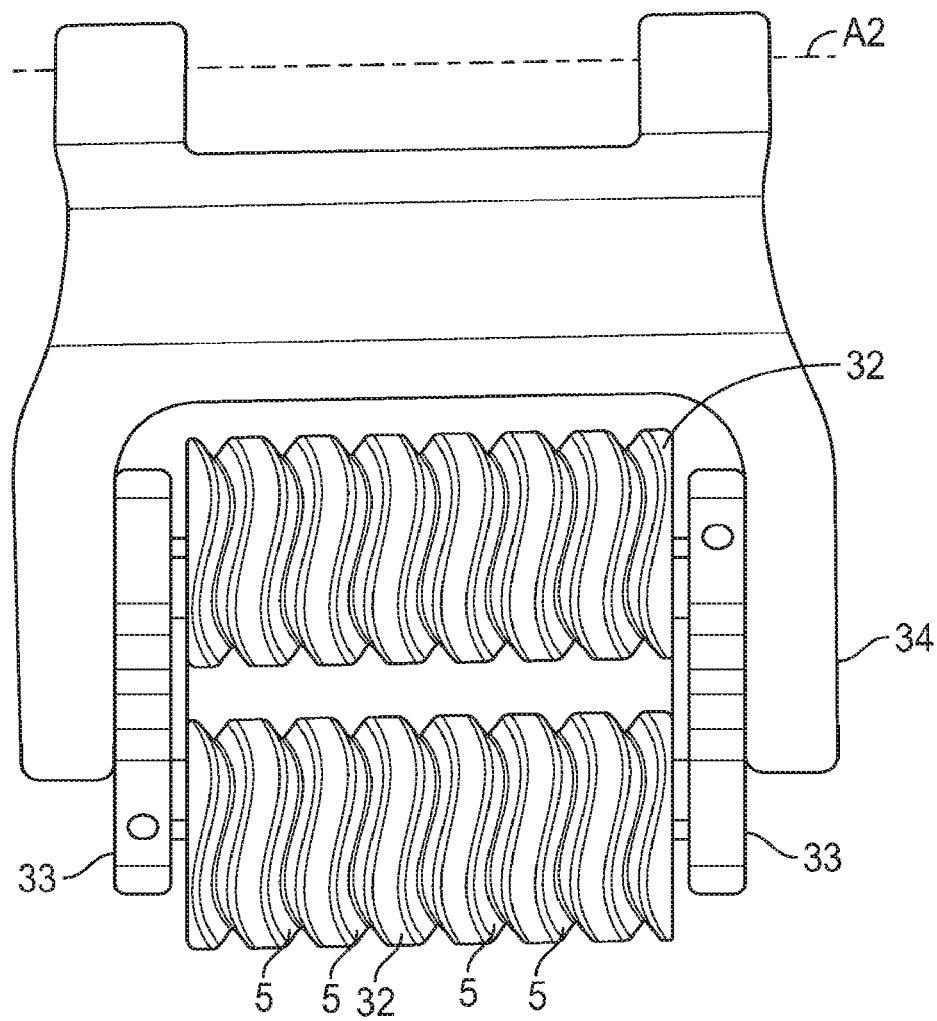
FIG. 5 is a top plan view of a distal portion of a fork blade thereof.
Figure 6:
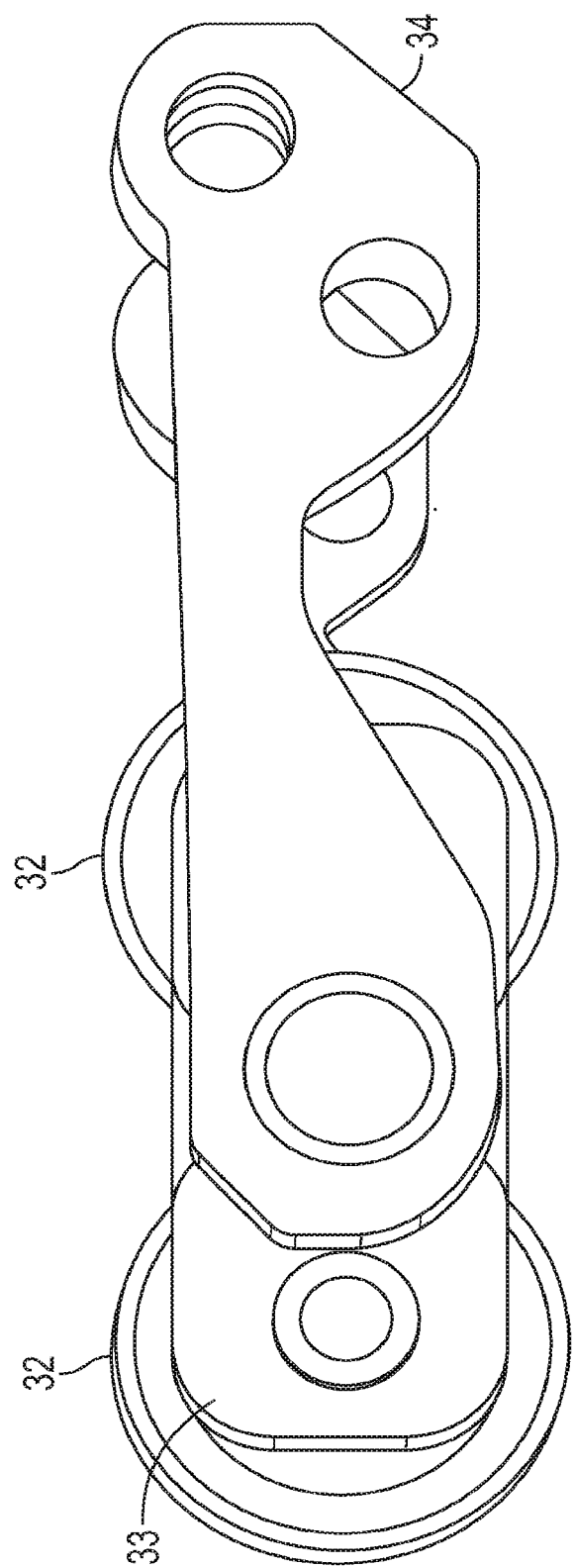
FIG. 6 is a plan view of a tandem wheel assembly thereof.

FIG. 5 shows a possible mounting arrangement of blade wheels 32 wherein tandem blade wheels 32 are mounted on a pivotal carrier 33 which, in turn, is pivotally mounted on rotating arm 34 which allows tandem blade wheels to move between the retracted position and the extended position. FIGS. 5 and 6 illustrate duel blade-wheels 32 mounted rotationally in tandem attached to bogle plates 33. Bogle plates 33 are rotationally mounted on swing arm 34. The advantage of the use of tandem wheels is that a load is distributed to four blade wheels 32 rather than only two, so that the applied stress on blade wheels 32 is reduced.

As shown in FIGS. 1 and 2, a lifting apparatus 14 based upon a hydraulic cylinder is mounted on board the mover 10. A pivotal handle 12 is used to generate hydraulic pressure by pivoting it in a vertical motion. Handle 12 is also used to push or pull and to steer mover 10 in rolling action across a factory floor or other industrial surface. This is very well known in the field. Below handle 12 are typically two steering wheels 16 that may be rotated from one side to the other by handle 12 for steering. Steering wheels 16 support the weight of the lifting apparatus 14, handle 12, and a portion of the load on blades 20, a pallet and its load (not illustrated). This is well known in the field.

Blade wheels 32 have a circular circumference and each may comprise three or more contiguous and integral tires 5 aligned in a linear order mounted on a common central core 4 which is aligned about axis A1, as shown in FIG. 3. Each said tire 5 has a peripheral surface 3 that is circular but wavers from side to side sinusoidally as blade wheel 32 rotates. This sinusoidal tire construction is clearly shown in FIG. 4.

Tires 5 may be molded of a hard polyurethane of a type that does not scuff or leave a mark on most surfaces. It is long wearing and does not break down due to heavy loading as conventional pallet wheels typically do. This is because the individual tires 5 tend to strain in the axial direction and are of a material that does not show cyclic strain hysteresis. The sinusoidal shape of tires 5 has the advantage of gripping a surface with a coefficient of friction nearly equal to that of a conventional tire having a width dimension equal to the side-to-side (peak-to-peak) dimension of tire 5 while, at the same time having the advantage of being approximately 30% lighter in weight providing savings in material cost. An important advantage of compound sinusoidal wheel 32 is that when an object such as a piece of gravel or a small stone is encountered by wheel 32 it tends to be pushed or rolled into a space between adjacent tires 5 and therefore has less of an effect on tire surface damage. This results in an improvement in tire duty cycle and time to failure.

The foregoing discussion presents preferred embodiments of the described and illustrated invention. The present invention is not limited to the described embodiments, and those skilled in the art will appreciate that the present invention can be practiced with varying modifications to the above disclosure without departing from the principles and spirit of the invention. Thus, the present invention is only defined and limited by the following claims and their equivalents.

What is claimed is:

1. A materials handling equipment comprising:
    a lifting apparatus engaged with a fork having a linearly extensive blade;
    a blade wheel engaged with said blade, wherein said blade wheel has a plurality of circular tires arranged side-by-side in an axial direction, wherein the plurality of circular tires is integrally formed so as to form a monolithic blade wheel made of a common material;
    wherein the blade wheel includes a first outer circumference and a second outer circumference, the first outer circumference being larger than the second outer circumference, the first outer circumference including a sinusoidally
    varying peripheral surface;
    wherein the first outer circumference defines the outer most circumference of each tire of the blade wheel and the second outer circumference defines a space in between each tire of the blade wheel; and
    wherein a substantially vertically extending end face of the wheel exhibits a sinusoidally varying surface.

2. The materials handling equipment of claim 1 wherein said blade wheel is engaged with said blade through a linkage wherein said blade wheel is movable between a retracted position and an extended position related respectively to lowered and raised blade positions.

3. The materials handling equipment of claim 1 further comprising linkages between said blade wheel and said lifting apparatus enabling mutual motion.

4. The materials handling equipment of claim 1 wherein the blade wheel is aligned with a second blade wheel in tandem.

5. The materials handling equipment of claim 4 wherein the blade wheel in tandem with the second blade wheel are mounted on a pivotal carrier.

6. The materials handling equipment of claim 5 wherein said pivotal carrier is engaged with a hinged swing arm.

7. A wheel for use with a forklift, said wheel comprising:
    a plurality of circular tires linearly aligned in side-by-side positions on a common rotational axis, wherein the plurality of circular tires is integrally formed so as to form a monolithic wheel made of a common material;
    wherein the wheel includes a first outer circumference and a second outer circumference, the first outer circumference being larger than the second outer circumference, the first outer circumference including a sinusoidally varying peripheral surface; and
    wherein the first outer circumference defines the outer most circumference of the
    wheel; and
    wherein at least one of the tires has a sinusoidally shaped side surface.

8. The wheel of claim 7 wherein each said sinusoidally varying peripheral surface has relative peaks and valleys uniformly spaced around the common rotational axis.

9. A method for equipping a forklift, the method comprising:

engaging a lifting apparatus with a fork, said fork having a linearly extensive blade;

rotationally engaging a blade wheel with said blade;

configuring said blade wheel with a plurality of circular tires;

wherein the blade wheel includes a first outer circumference and a second outer circumference, the first outer circumference being larger than the second outer circumference, the first outer circumference including a sinusoidally varying peripheral surface, wherein the first outer circumference defines the outer most circumference of each tire of the blade wheel and the second outer circumference defines a space in between each tire of the blade wheel;

wherein a substantially vertically extending end face of the wheel exhibits a sinusoidally varying surface; and wherein the plurality of circular tires is integrally formed so as to form a monolithic blade wheel made of a common material.

10. The method of claim 9 further comprising linking said blade wheel with said blade for mutual motion.

11. The method of claim 10 further comprising moving said blade wheel between retracted and extended positions while respectively lowering and raising said fork.

12. The method of claim 11 further comprising linking said blade wheel and said lifting apparatus in mutual motion.

13. The method of claim 9 further comprising positioning the blade wheel in tandem with a second blade wheel.

14. The method of claim 13 further comprising mounting the blade wheel in tandem with the second blade wheel on a pivotal carrier.

15. The method of claim 14 further comprising pivotally mounting said pivotal carrier on a hinged swing arm.

* * * * *